(12) United States Patent
Kim et al.

(10) Patent No.: US 9,367,279 B2
(45) Date of Patent: Jun. 14, 2016

(54) DISPLAY DEVICE AND METHOD OF CONTROLLING THEREFOR

(71) Applicant: LG ELECTRONICS INC., Seoul (KR)

(72) Inventors: Jihwan Kim, Seoul (KR); Sihwa Park, Seoul (KR); Yongsin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

(21) Appl. No.: 14/284,924

(22) Filed: May 22, 2014

(65) Prior Publication Data

US 2015/0301665 A1 Oct. 22, 2015

(30) Foreign Application Priority Data

Apr. 21, 2014 (KR) .................. 10-2014-0047282

(51) Int. Cl.
*G06F 3/14* (2006.01)
*G06F 3/0488* (2013.01)
*G06F 1/16* (2006.01)
*G06F 3/0346* (2013.01)

(52) U.S. Cl.
CPC ............ *G06F 3/1423* (2013.01); *G06F 1/1647* (2013.01); *G06F 3/0488* (2013.01); *G06F 3/0346* (2013.01)

(58) Field of Classification Search
CPC ............ H04M 1/0235; H04M 2250/16; G06F 1/1647; G06F 1/1641; G09G 2340/04; G09G 2340/0407; G09G 2340/0414; G09G 2340/0421
See application file for complete search history.

(56) References Cited

U.S. PATENT DOCUMENTS

| | | | | |
|---|---|---|---|---|
| 2011/0298826 | A1* | 12/2011 | Namba | ............... G06F 1/1616 345/635 |
| 2012/0162048 | A1* | 6/2012 | Mitsunaga | ............ G06F 3/1423 345/1.3 |
| 2012/0280924 | A1* | 11/2012 | Kummer | ............. H04M 1/0235 345/173 |
| 2013/0009890 | A1 | 1/2013 | Kwon | |
| 2013/0344919 | A1 | 12/2013 | Kim et al. | |

* cited by examiner

*Primary Examiner* — Shaheda Abdin
(74) *Attorney, Agent, or Firm* — Birch, Stewart, Kolasch & Birch, LLP

(57) ABSTRACT

A display device and a method of controlling therefor are disclosed. The display device includes a display configured to include a first touch display area which is arranged to display content toward a first direction and a second touch display area which is arranged to display content toward a second direction corresponding to an opposite direction of the first direction, a sensor unit configured to detect a gripped state of the user and a rotating state of the display device and when it is determined that the second touch display area is facing the first direction at which the user is positioned based on the gripped state and the rotating state, a controller configured to change a display mode within an identical content which is outputted in the second touch display area.

17 Claims, 11 Drawing Sheets

(1)

(2)

(1)

(2)

(1)

(2)

(1)

(2)

(1)

(2)

(1)

(2)

(1)

(2)

DISPLAY DEVICE AND METHOD OF CONTROLLING THEREFOR

Pursuant to 35 U.S.C. §119(a), this application claims the benefit of the Korean Patent Application No. 10-2014-0047282, filed on Apr. 21, 2014, which is hereby incorporated by reference as if fully set forth herein.

BACKGROUND OF THE INVENTION

1. Field of the Invention

The present specification relates to a display device and a method of controlling therefor.

2. Discussion of the Related Art

Various display devices are developing in accordance with advancement of an electronic technology. As the display devices become popular, the display devices are used as a personal device. And, as the display device are implemented with high specifications, the display devices can perform such various functions as internet access, picture capturing, playing videos, playing music, a navigation function, group chatting and the like as well as a basic function.

Meanwhile, a display device equipped with displays in both sides, i.e., a front side and a rear side, is developing as well. The display device equipped with the displays in both sides can display contents different from each other using each of the displays. While using a first content displayed via a front display, a user can use a second content displayed via a rear display. The user checks the second content displayed via the rear display in a moment and may be then able to use the first content again. In some cases, the user may use the second content displayed via the rear display instead of the first content.

Hence, it is necessary to have a technology of displaying contents with a proper display mode in accordance with an intention of the user. And, since only 2 contents are displayed via the front and the rear display, it is necessary to have a technology capable of using more contents.

SUMMARY OF THE INVENTION

Accordingly, the present specification is directed to an apparatus and method thereof that substantially obviate one or more problems due to limitations and disadvantages of the related art. An object of the present specification is to provide a display device outputting contents with an appropriate mode using movement information of the display device and location information of a user and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a display device includes a display configured to include a first touch display area which is arranged to display content toward a first direction at which a user is positioned and a second touch display area which is arranged to display content toward a second direction corresponding to an opposite direction of the first direction, a sensor unit configured to detect a gripped state of the user and a rotating state of the display device and if it is determined that the second touch display area is facing the first direction at which the user is positioned based on the gripped state and the rotating state, a controller configured to change a display mode within an identical content which is outputted in the second touch display area, the controller configured to determine whether the gripped state of the user is changed in a manner of comparing the gripped state of the user which is detected immediately before a rotation of the display device with the gripped state of the user which is detected after the rotation of the display device.

And, the sensor unit is configured to detect information on at least one of a touch area and a touch shape of a hand of the user gripping the display device and the controller is configured to determine a direction at which the user is positioned based on the detected information.

And, the sensor unit is configured to include a camera, the camera is configured to capture the user and the controller is configured to determine a direction at which the user is positioned based on information on the captured user.

And, the controller is configured to determine whether the gripped state of the user is changed in a manner of further comparing the gripped state of the user which is detected while the display device is rotating.

And, if the second touch display area is arranged toward the first direction in a manner that the display device rotates more than a predetermined angle in a predetermined first rotating direction and if it is determined as the gripped state of the user is maintained as a result of comparing the gripped state of the user detected after the rotation with the gripped state of the user detected immediately before the rotation, the controller is configured to control the second touch display area to display the content in a full screen mode.

And, if a touch input is received via the second touch display area, the controller is configured to control the second touch display area to display the content in an input mode.

And, if a rotated state of the display device and the gripped state of the user are maintained for more than a predetermined time, the controller is configured to control the second touch display area to display the content in a final mode corresponding to a mode used to display the content in the second touch display area.

And, the controller is configured to turn off the first touch display area.

And, if the second touch display area is arranged toward the first direction in a manner that the display device rotates more than a predetermined angle in a predetermined second rotating direction and if it is determined as the gripped state of the user is maintained as a result of comparing the gripped state of the user detected after the rotation with the gripped state of the user detected immediately before the rotation, the controller is configured to control the second touch display area to display the content in a predetermined mode.

Meanwhile, the predetermined mode corresponds to either an input mode or a full screen mode.

And, the input mode may correspond to a mode displaying a touch input area in at least one touch display area of the first touch display area and the second touch display area.

And, the touch input area may correspond to an area displaying at least one selected from the group consisting of a text input window, a virtual keypad, a scroll bar and a control menu.

Meanwhile, if the second touch display area is arranged toward the first direction in a manner that the display device rotates more than a predetermined angle in a predetermined first rotating direction and if it is determined as the gripped state of the user is changed as a result of comparing the gripped state of the user detected after the rotation with the gripped state of the user detected immediately before the rotation, the controller is configured to control the second touch display area to display the content in an input mode.

To further achieve these objects and other advantages and in accordance with the purpose of the invention, as embodied and broadly described herein, according to one embodiment, a display device includes a display configured to include a first touch display area which is arranged to display content toward a first direction at which a user is positioned and a second touch display area which is arranged to display content toward a second direction corresponding to an opposite direction of the first direction, a sensor unit configured to detect a gripped state of the user and a rotating state of the display device and if it is determined that the second touch display area is facing the first direction at which the user is positioned based on the gripped state and the rotating state, a controller configured to change content which is outputted in the second touch display area, the controller configured to determine whether the gripped state of the user is changed in a manner of comparing the gripped state of the user which is detected immediately before a rotation of the display device with the gripped state of the user which is detected after the rotation of the display device.

And, if the second touch display area is arranged toward the first direction in a manner that the display device rotates more than a predetermined angle in a predetermined first rotating direction and if it is determined as the gripped state of the user is maintained as a result of comparing the gripped state of the user detected after the rotation with the gripped state of the user detected immediately before the rotation, the controller is configured to control the second touch display area to display a predetermined first application content.

And, if the second touch display area is arranged toward the first direction in a manner that the display device rotates more than a predetermined angle in a predetermined second rotating direction and if it is determined as the gripped state of the user is maintained as a result of comparing the gripped state of the user detected after the rotation with the gripped state of the user detected immediately before the rotation, the controller is configured to control the second touch display area to display a predetermined second application content.

And, if the second touch display area is arranged toward the first direction in a manner that the display device rotates more than a predetermined angle in a predetermined first rotating direction and if it is determined as the gripped state of the user is changed as a result of comparing the gripped state of the user detected after the rotation with the gripped state of the user detected immediately before the rotation, the controller is configured to control the second touch display area to display a predetermined third application content.

And, if the second touch display area is arranged toward the first direction in a manner that the display device rotates more than a predetermined angle in a predetermined second rotating direction and if it is determined as the gripped state of the user is changed as a result of comparing the gripped state of the user detected after the rotation with the gripped state of the user detected immediately before the rotation, the controller is configured to control the second touch display area to display a predetermined fourth application content.

To further achieve these objects and other advantages and in accordance with the purpose of the invention, as embodied and broadly described herein, according to one embodiment, a method of controlling a display device including a display, which includes a first touch display area and a second touch display area, includes the steps of detecting a gripped state of a user and a rotating state of the display device, determining whether the first touch display area, which is arranged toward a first direction at which the user is positioned, is facing a second direction corresponding to an opposite direction of the first direction, whether the second touch display area, which is arranged toward the second direction, is facing the first direction and whether the gripped state of the user is changed based on the rotating state of the display device, and if it is determined that the second touch display area is facing the first direction at which the user is positioned, changing a display mode within an identical content which is outputted in the second touch display area, wherein the determining step determines whether the gripped state of the user is changed in a manner of comparing the gripped state of the user which is detected immediately before a rotation of the display device with the gripped state of the user which is detected after the rotation of the display device.

And, if the second touch display area is arranged toward the first direction in a manner that the display device rotates more than a predetermined angle in a predetermined first rotating direction and if it is determined as the gripped state of the user is maintained as a result of comparing the gripped state of the user detected after the rotation with the gripped state of the user detected immediately before the rotation, the display mode changing step displays content in the second touch display area in a full screen mode.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
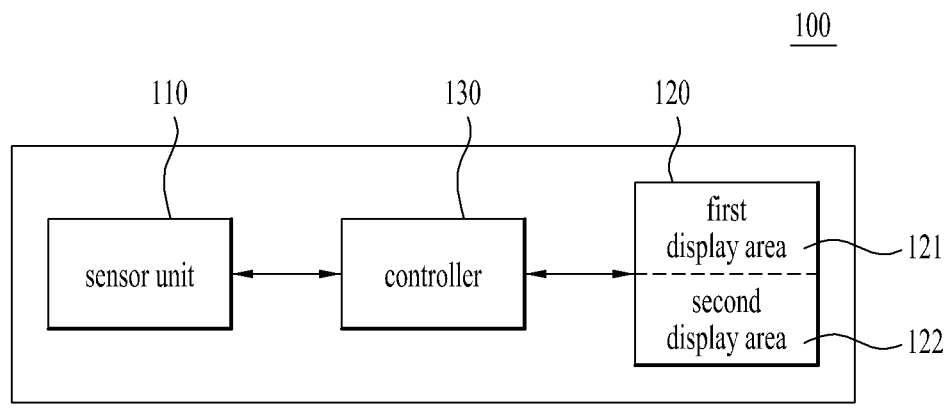
FIG. 1 is a block diagram for a display device according to one embodiment.

In the following description, preferred embodiments capable of concretely implementing the aforementioned object are explained with reference to attached drawings. In this case, composition and effect shown in the drawings and explained by the preferred embodiments are explained as at least one embodiment. A technical idea, a core composition and effect may be non-limited by the embodiment.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

FIG. 1 is a block diagram for a display device according to one embodiment.

Referring to FIG. 1, a display device 100 can include a sensor unit 110, a display 120 and a controller 130.

The sensor unit 110 can detect a gripped state of a user and a rotating state of the display device. For instance, the sensor unit 110 can include a touch sensor, a pressure sensor, a grip detection sensor and the like. The gripped state of the user can be detected by the aforementioned touch sensor, the pressure sensor, the grip detection sensor and the like.

The touch sensor (not depicted) can be implemented by a touch recognition layer formed with the display 120 as one body or can be implemented in a housing part (or bezel part) of the display device 100. The touch sensor can detect information on at least one of a touch area and a touch shape of a hand of a user gripping the display device 100.

The pressure sensor (not depicted) can be implemented by a touch recognition layer formed with the display 120 as one body or can be implemented in the housing part of the display device 100. The pressure sensor can detect information on a contacting part, pressure strength and the like of a hand of the user gripping the display device 100.

And, the grip detection sensor (not depicted) can detect a gripped state of the user gripping the display device 100.

Meanwhile, the sensor unit 110 can include such an inertial sensor as an acceleration sensor, a gyro sensor, a terrestrial magnetism sensor and the like. A rotating state of the display device 100 can be detected by the aforementioned acceleration sensor, the gyro sensor, the terrestrial magnetism sensor and the like. Rotating state information of the display device 100 can include rotation angle information and rotation direction information.

The display 120 can include a first touch display area 121 and a second touch display area 122. The display 120 can be implemented by two display modules physically separated from each other. Or, the display 120 can be implemented in a manner of making the display to be separately displayed by two specific areas in consideration of a usage and the like of the display device, although the display device is implemented by a single physical display module. And, separately displaying two areas can be performed when a specific condition is satisfied only.

The first touch display area 121 can be arranged to display content toward a first direction at which a user is positioned and the second touch display area 122 can be arranged to display content toward a second direction which is an opposite direction of the first direction. The arrangement of the first touch display area 121 and the arrangement of the second touch display area 122 can be implemented in a stationary form in a manner of being positioned at opposite directions, respectively. Or, both touch display areas can be implemented in a variable form making the touch display areas face directions different from each other according to a usage and the like. The arrangement of the display 120 shall be described later in detail.

In the present specification, the first direction indicates a direction identical to the front direction of a display displaying content by a general display device. Hence, the first direction means a direction at which a user of the display device is positioned in general. The second direction indicates an opposite direction of the first direction.

The controller 130 can change a screen (view) of the second touch display area based on a gripped state of a user and a rotating state of the display device 100. In particular, the controller 130 can change a display mode within an identical content which is outputted in the second touch display area 122. For instance, the display mode can include a full screen mode, an input mode and the like. The controller 130 can change the display mode of content, which is outputting in the second touch display area 122 in accordance with a predetermined attribute, to the full screen mode or the input mode without changing the content.

Or, the controller 130 can change the content outputting in the second touch display area 122. For instance, the controller 130 can output predetermined content according to a rotating direction and a gripped state.

As mentioned in the foregoing description, the first touch display area 121 can be arranged to display content toward the first direction at which a user is positioned in the beginning and the second touch display area 122 can be arranged to display content toward the second direction corresponding to an opposite direction of the first direction.

The controller 130 can determine whether a gripped state of a user is changed in a manner of comparing the gripped state of the user, which is detected immediately before the display device rotates, with the gripped state of the user, which is detected after the display device has rotated. By doing so, the controller can determine whether the display device 100 has rotated. If it is determined that the second touch display area 122 faces the first direction at which the user is positioned, the controller 130 can change a screen (view) of the second touch display area 122.

As mentioned in the foregoing description, the controller 130 can determine a rotating state of the display device 100 using information detected by such an inertia sensor as an acceleration sensor, a gyro sensor, a terrestrial magnetism sensor and the like. And, the controller 130 can detect a gripped state of a user using information detected by a touch sensor, a pressure sensor, a grip detection sensor and the like.

Meanwhile, the controller 130 can determine a location of a user using the information detected by the touch sensor, the pressure sensor, the grip detection sensor and the like. A method of determining the location of the user using various sensors shall be described later. The sensor unit 110 includes a camera and the camera can capture the user. The controller 130 can determine a direction at which the user is positioned based on information on the user captured by the camera.

In the following, the display device 100 including the first touch display area 121 and the second touch display area 122 is explained.

Figure 2:
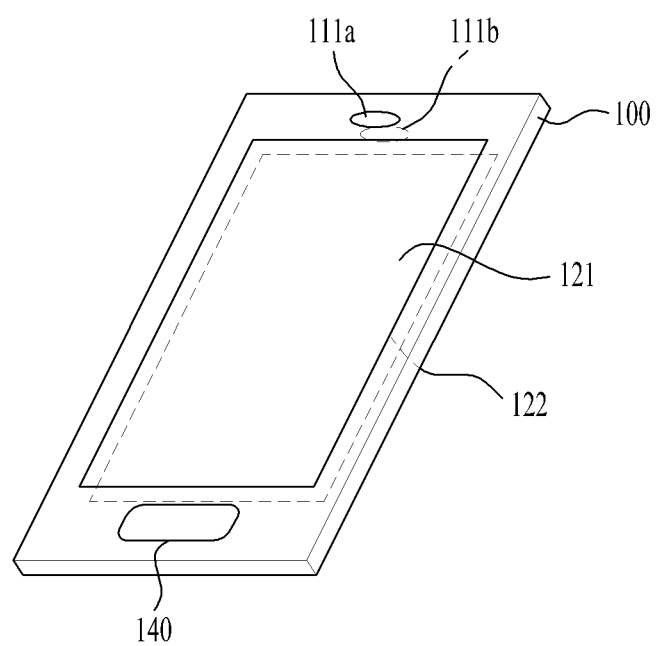
FIG. 2 is a perspective diagram for a display device according to one embodiment.

FIG. 2 is a perspective diagram for a display device according to one embodiment.

FIG. 2 shows a display device 100 including a first touch display area 121 and a second touch display area 122 physically separated from each other.

The display device 100 can include the first touch display area 121, the second touch display area 122, a first camera 111a, a second camera 111b and an input unit 140.

The first touch display area 121 and the second touch display area 122 can be included in a display. The first touch display area 121 can be arranged toward a first direction and the second touch display area 122 can be arranged toward a second direction. Yet, if the display device 100 rotates 180 degrees, the second touch display area 122 is arranged toward the first direction and the first touch display area 121 can be arranged toward the second direction. The first touch display area 121 and the second touch display area 122 can be implemented in a manner of being physically separated from each other.

The first camera 111a and the second camera 111b can be included in the sensor unit 110. The first camera 111a can be arranged toward the first direction and the second camera 11b can be arranged toward the second direction. The first camera 111a and the second camera 111b capture subjects and the controller can determine a direction at which a user is positioned by analyzing captured images.

The input unit 140 can receive a touch input in a manner of being implemented as one body with the display or can be individually implemented irrespective of the display. For instance, the input unit 140, which is individually implemented irrespective of the display, can be implemented in such a form as a keypad, a touch pad, a button, or the like.

Figure 3:
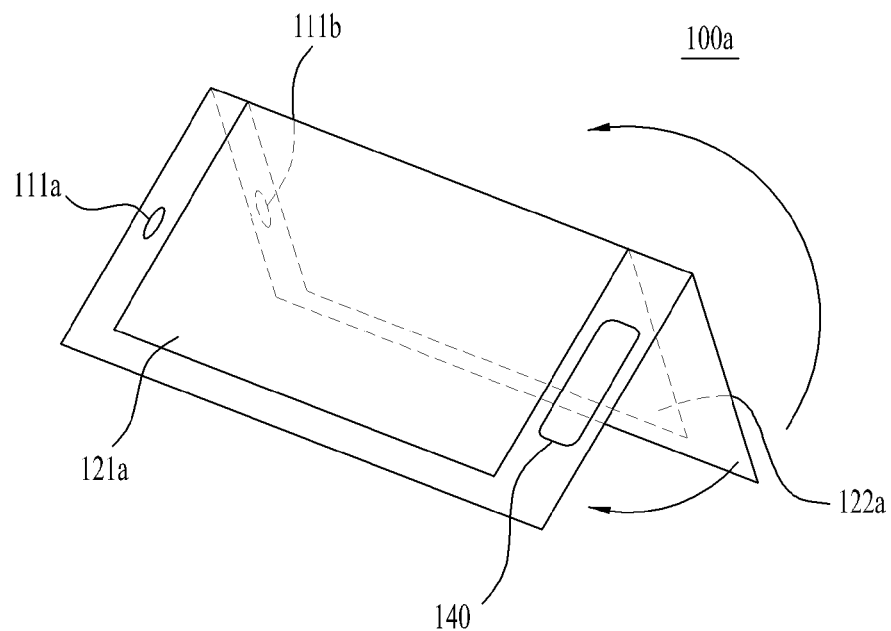
FIG. 3 is a perspective diagram for a display device according to a different embodiment.

FIG. 3 is a perspective diagram for a display device according to a different embodiment.

FIG. 3 shows a display device 100a in which a first touch display area 121a and a second touch display area 122a are physically formed as one body.

The display device 100a can include the first touch display area 121a, the second touch display area 122a, a first camera 111a, a second camera 111b and an input unit 140.

The first touch display area 121a and the second touch display area 122a can be included in the display. For instance, the first touch display area 121a and the second touch display area 122a can be implemented as a single flexible display module. The display device 100a can be folded in order to make a displaying face of the first touch display area 121a and a displaying face of the second touch display area 122a meet with each other. This state may be called an off state.

And, the display device can be folded to make the first touch display area 121a face the first direction and make the second touch display area 122a face the second direction. This state may be called a folded state.

And, the display device 100a can be unfolded to make the first touch display area 121a and the second touch display area form 180 degrees. This state may be called a big screen state.

For instance, if the display device 100a is in the big screen state, the first touch display area 121a and the second touch display area 122a can display content without distinction of a specific area like a single display does. And, if the display device 100a is in the folded state, the first touch display area 121a and the second touch display area 122a can display contents different from each other on the basis of a folded boundary. By doing so, the first touch display area 121a and the second touch display area 122a can operate like physically separated displays do.

The first camera 111a and the second camera 111b can be included in the sensor unit 110 and the input unit 140 can be individually implemented irrespective of the display. The first camera 111a, the second camera 111b and the input unit 140 are identical to what is described in FIG. 2.

An example of the display device including a physically separated hard display has been explained in FIG. 2 and an example of the display device including a flexible display implemented as physically one body has been explained in FIG. 3. Yet, the display device can be implemented as a flexible display although the display device is physically separated. And, the display device includes a physically separated hard display and can be implemented in a foldable form. And, the display can be implemented as a transparent display module.

So far, various implementable display devices have been explained. In the following, a method of detecting a gripped state and a method of determining a location of a user are explained.

Figure 4:
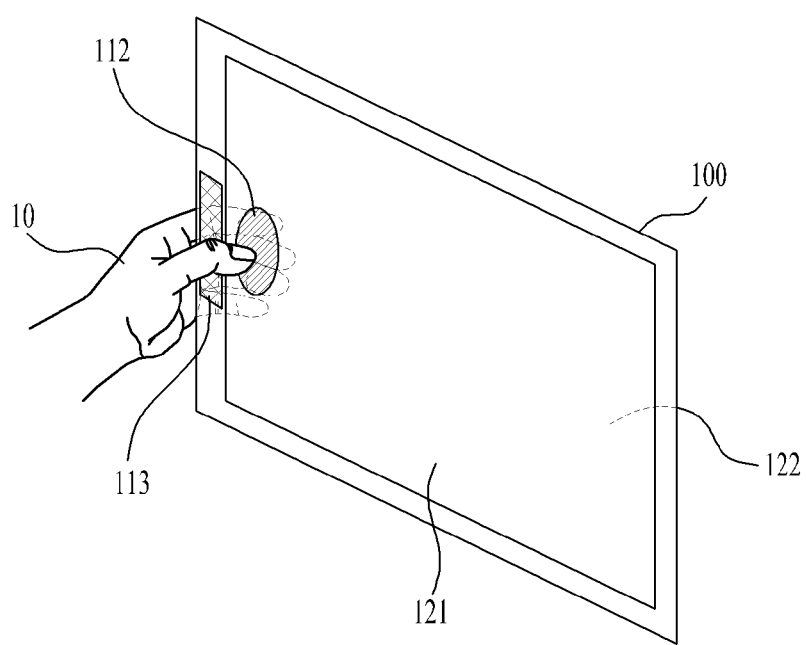
FIG. 4 is a diagram for explaining a method of detecting a gripped state of a user according to one embodiment.

FIG. 4 is a diagram for explaining a method of detecting a gripped state of a user according to one embodiment.

FIG. 4 shows a state that a user 10 grips a display device 100. Although FIG. 4 shows the display device including a physically separated hard display, the display device can be implemented in various forms as mentioned in the foregoing description.

The display device 100 can include a first touch display area 121, a second touch display area 122, a touch sensor 112 and a pressure sensor 113. The touch sensor 112 can detect a touch input of the first touch display area 121 and a touch input of the second touch display area 122. The pressure sensor 113 can be replaced with the touch sensor or a grip sensor. The display device 100 can be implemented with the touch sensor 112 only.

If the user 10 grips the display device 100, the first touch display area 121, the second touch display area 122 and a housing (or bezel) area of the display device 100 are contacted with the user 100 or pressed. Hence, the display device 100 detects information on the areas gripped by the user 10 via the touch sensor 112 and may be then able to determine that the user 10 is currently gripping the areas and the areas gripped by the user. If the user 10 changes a gripped state, the display device 100 can detect changes of the gripped part, an area of the gripped part, and a shape of the gripped part and may be then able to determine that the gripped state of the user 10 has changed. The gripped state shall be described later in detail.

The display device 100 can include the pressure sensor in the housing. The pressure sensor can be included in the whole of the housing or can be included in the housing in a form of being arranged with a prescribed space. And, the pressure sensor can be included in such a specific area of the housing as an upper part edge, a bottom part edge, a left part edge, a right part edge or the like. Or, the pressure sensor can be included in a side of the housing. The display device 100 can detect a pressure according to a grip of the user 10. The display device 100 can determine a gripped state using detected pressure information. If the user 10 changes the gripped state, the display device 100 can determine that the gripped state of the user 10 has changed in a manner of detecting a change of the information on a part on which a pressure is detected, an area, a shape and the like.

In the following, when a user grips the display device 100, a method for the display device 100 to determine the gripped state of the user and a location of the user is explained.

Figure 5:
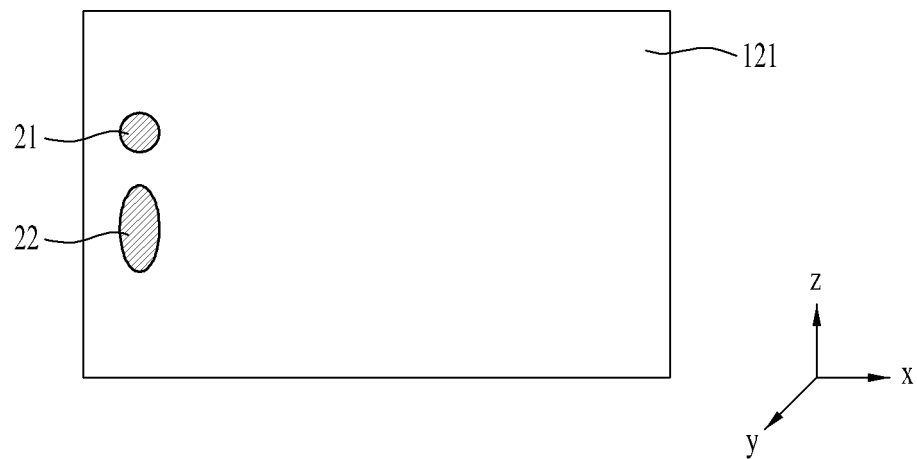
FIG. 5 is a diagram for explaining detection of a gripped state of a user via a touch display according to one embodiment.
Figure 5:
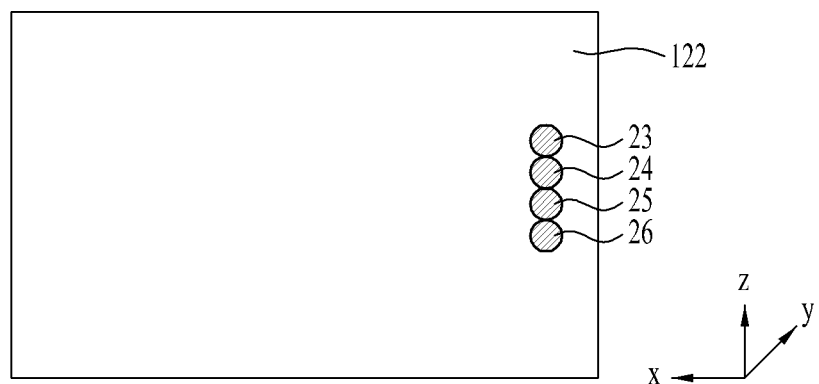

FIG. 5 is a diagram for explaining detection of a gripped state of a user via a touch display according to one embodiment.

Although the sensor unit (e.g., touch sensor) practically receives information on an area touched by a user, it is explained that a touch display area receives touch information for clarity. In particular, in FIG. 5, receiving the touch information by the touch display area indicates that the touch sensor included in the touch display area receives the touch information. As depicted in FIG. 4, the user is gripping the display device 100.

FIG. 5 (1) shows touch information inputted on the first touch display area 121 in case that a user grips the display device by a left hand. In FIG. 5 (1), y direction is a direction at which the first touch display area 121 is facing and z direction is a direction heading toward the sky. In particular, the user can be positioned at the y direction.

If the user grips the display device by a left hand, a part of a palm positioned at the bottom of a thumb of the left hand of the user and the thumb touch the first touch display area 121. Hence, the first touch display area 121 can receive touch information 21 on the thumb and touch information 22 on the part of the palm positioned at the bottom of the thumb.

In some cases, the first touch display area 121 may receive either the touch information 21 on the thumb or the touch information 22 on the part of the palm positioned at the bottom of the thumb only. Or, the first touch display area 121 may receive one information with which the touch information 21 on the thumb and the touch information 22 on the part of the palm positioned at the bottom of the thumb are combined.

FIG. 5 (2) shows touch information inputted on the second touch display area 122. In FIG. 5 (2), y direction is a direction at which the first touch display area 121 is facing and z direction is a direction heading toward the sky. In particular, the user may be positioned at the y direction and the second touch display area 122 can be arranged toward −y direction corresponding to an opposite direction of the y direction.

If the user grips the display device by a left hand, an index finger, a middle finger, a ring finger and a little finger of the left hand touch the second display area 122. Hence, the second touch display area 122 can receive touch information 23 on the index finger, touch information 24 on the middle finger, touch information 25 on the ring finger and touch information 26 on the little finger.

In some cases, the second touch display area 122 may receive part of the touch information 23 on the index finger, the touch information 24 on the middle finger, the touch information 25 on the ring finger and the touch information 26 on the little finger. Or, the second touch display area 122 may receive one information with which the touch information 23 on the index finger, the touch information 24 on the middle finger, the touch information 25 on the ring finger and the touch information 26 on the little finger are combined.

As depicted in FIG. 5, the touch information on the hand of the user inputted on the first touch display area 121 is different from the touch information on the hand of the user inputted on the second touch display area 122. Hence, the display device can detect the gripped state of the user gripping the display device. And, the display device detects information on at least one of a touched area and a touched shape of the hand of the user gripping the display device and may be then able to determine a direction at which the user is positioned based on the detected information.

The display device can further include a camera. The camera can capture a subject and can detect a user by analyzing the capture subject. The display device may determine a direction at which a user is positioned based on information on the captured user. The display device can determine touch information of the detected user based on a gripped state of the user prior to a rotation of the display device.

Similar to what is explained in FIG. 5, in case that the touch sensor is included in the housing, the display device can determine the gripped state of the user using information on a touched area, a touched shape and the like. And, in case that the pressure sensor is included in the housing, the display device can determine the gripped state of the user using information on an area on which a pressure is put, a shape, an area and the like.

The user can rotate the display device while maintaining or changing the gripped state. If it is determined that the display device has rotated, the display device can compare touch information which is inputted after a rotation of the display device with touch information which is inputted immediately before the rotation of the display device. The inputted touch information of the user means the gripped state of the user. The display device compares the gripped state of the user which is detected immediately before the rotation of the display device with the gripped state of the user after the rotation of the display device and may be then able to determine whether the gripped state of the user is changed.

In some cases, the display device can further use touch information of the user which is inputted while the display device is rotating. As one embodiment, the display device can compare touch information of the user inputted when the display device forms a specific angle while rotating. In case that an angle formed by the display device immediately before the rotation of the display device corresponds to 0 degree and an angle formed by the display device after the rotation of the display device corresponds to 180 degrees, the display device can receive an input of the touch information when the rotation angle of the display device corresponds to 90 degrees. The display device compares the gripped states of the user with each other when the rotation angle of the display device corresponds to 0, 90, and 180 degrees. If the touch information changes just once, the display device can determine it as the gripped state has changed. Or, the display device can receive inputs of the touch information whenever the rotation angle of the display device corresponds to 30, 60, 90, 120 and 150 degrees. The display device compares a series of gripped states with each other and if the touch information changes more than 3 times, the display device can determine it as the gripped state has changed. The aforementioned specific angle, specific number of times and the like are just an example. It is able to determine whether the gripped state has changed in various ways.

As a different embodiment, the display device continuously receives inputs of touch information of the user while rotating, compares the touch information with each other, and may be then able to determine whether the gripped state of the user has changed.

In the following, a detailed embodiment for changing a display screen by determining a gripped state and a rotating state is explained.

Figure 6:
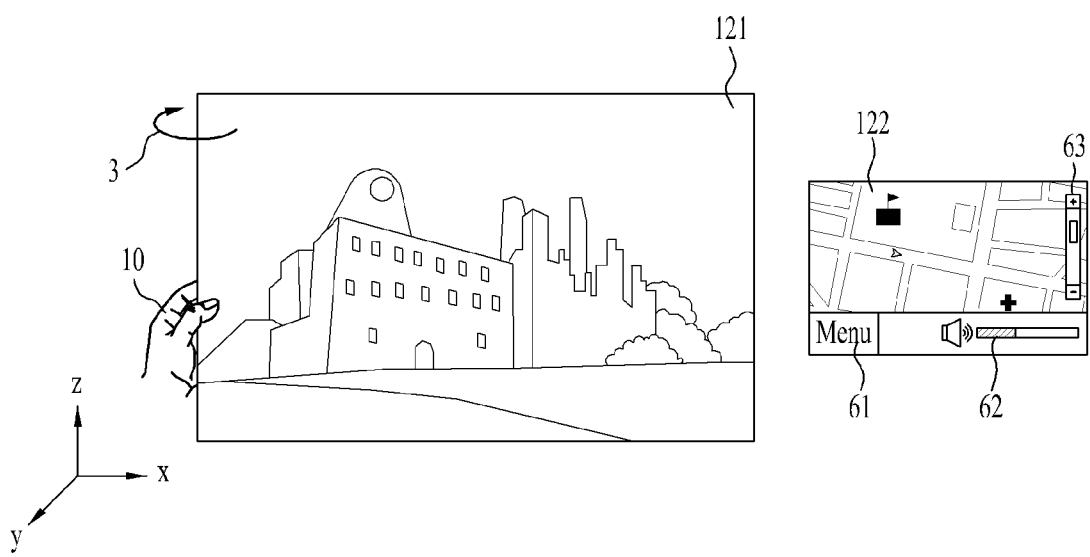
FIG. 6 is a diagram for explaining a change of a content mode according to a first embodiment.
Figure 6:
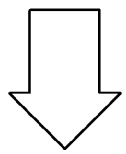
Figure 6:
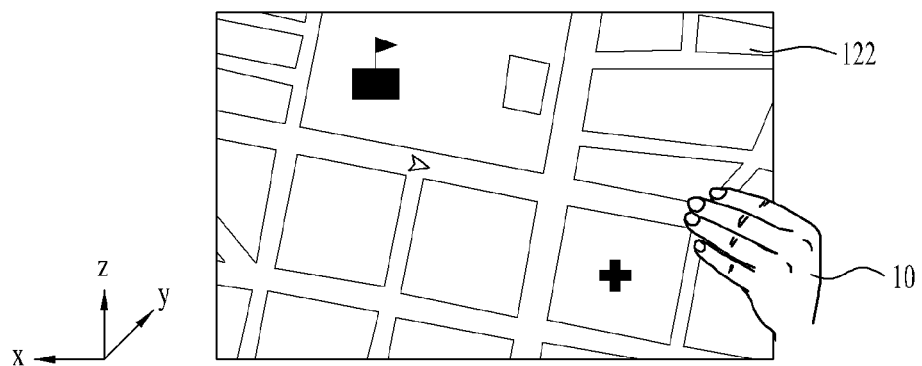

FIG. 6 is a diagram for explaining a change of a content mode according to a first embodiment.

Referring to FIG. 6 (1), the first touch display area 121 and the second touch display area 122 can display contents different from each other, respectively. For instance, the first touch display area 121 can display a video and the second touch display area 122 can display a location information application of a specific vehicle. A user is gripping the display device by a left hand 10. Y direction is a direction at which the first touch display area 121 is facing and −y direction is a direction at which the second touch display area 122 is facing. In particular, the user may be positioned at the y direction in FIG. 6 (1) and the y direction corresponds to a first direction.

The location information application of the specific vehicle displayed in the second touch display area 122 can be displayed by an input mode including various input areas. The input mode indicates a mode for displaying a touch input area in a display area. In particular, the input mode means a mode for displaying a separate UI as well as a main content information. The separate UI may correspond to a form of overlay. For instance, the touch input area or the separate UI indicates such an area capable of inputting a touch input as a text input window, a virtual keypad, a scroll bar, a control menu, a up down button, a left right button and the like. In particular, the location information application of the specific vehicle displayed in the second touch display area 122 can be displayed by the input mode displaying such an input area as a menu button 61, a volume control bar 62, a screen size control menu 63.

Meanwhile, there exists a full screen mode except the input mode. The full screen mode indicates a mode for displaying main content information only in a whole of the display area while the separate UI is not displayed at all or displayed in a manner of minimizing the separate UI. For instance, in case of a video content, the full screen mode may correspond to a mode for displaying the video itself only and the input mode may correspond to a mode for displaying such a control menu in an overlay form as a stop, a play, a volume control bar, a playback position control bar as well as the video. In some cases, the second touch display area 122 arranged toward the second direction may be in a turn-off state.

The user may rotate the display device to a first rotation direction 3 while the gripped state of the left hand is maintained. Although the first rotation direction 3 is depicted as a left/right direction in FIG. 6, the first rotation direction can be configured by a different direction.

If the display device rotates more than a predetermined angle in the first rotation direction 3, the second touch display area 122 can be arranged toward the first direction. A rotation of the display device can be detected using at least one inertia sensor such as an acceleration sensor, a gyro sensor, a terrestrial magnetism sensor and the like. For instance, the predetermined angle can be set to 150 degrees. The user can perform a different operation while gripping the display device. Hence, although the user has no intention of rotating the display device, the display device may rotate a little. Hence, a specific angle can be configured to make the display device identify the rotation of the display device.

In case that the rotation of the display device has been performed, the display device compares the gripped state before the rotation with the gripped state after the rotation and may be then able to determine whether the gripped state has changed.

Referring to FIG. 6 (2), the display device has rotated more than a predetermined angle in the first rotation direction 3 and the second touch display area 122 is arranged toward the first direction at which the user is positioned. Y direction is a direction at which the first touch display area 121 is facing and −y direction is a direction at which the second touch display area 122 is facing. In particular, in FIG. 6 (2), the user may be positioned at the −y direction and the −y direction corresponds to the first direction.

The display device can determine as the display device is maintained in a manner of comparing the gripped state before the rotation of the display device with the gripped state after the rotation of the display device. In this case, the second touch display area 122 can change a mode only while content, which is used to be displayed before the rotation, is maintained. The display device can display the content in the second touch display area 122 in a full screen mode. In particular, the second touch display area 122 can display such a main content as the location information of the specific vehicle only without displaying the input area such as the menu button 61, the volume control bar 62 and the screen size control menu 63.

Meanwhile, when the second touch display area 122 is arranged toward the first direction in a manner of being rotated and the content is displayed in the full screen mode, if the display device receives a touch input via the second touch display area 122, a content output mode of the second touch display area 122 can be changed to the input mode. In particular, the second touch display area 122 can display the input area such as the menu button 61, the volume control bar 62 and the screen size control menu 63 as well as the main content such as the location information of the specific vehicle.

And, if the rotated state of the display device and the gripped state of the user are maintained for more than a predetermined time, the display device can display the content in a final mode. For instance, since the location information application of the specific vehicle, which is displayed in the second touch display area 122 before the rotation of the display device, is displayed in the input mode, the input mode corresponds to the final mode. When the predetermined time is set to 5 seconds, if the gripped state of the user and the rotated state of the display device are maintained for 5 seconds, the location information application of the specific vehicle displayed in the second touch display area 122 can be changed to the input mode.

Meanwhile, the first touch display area 121 arranged toward the second direction can be turned off according to the rotation of the display device. In this case, if the first touch display area 121 is arranged toward the first direction again in a manner that the display device rotates in a direction in opposition to the first rotation direction 3, the first touch display area 121 is turned on and the second touch display area 122 arranged toward the second direction may be turned off.

Figure 7:
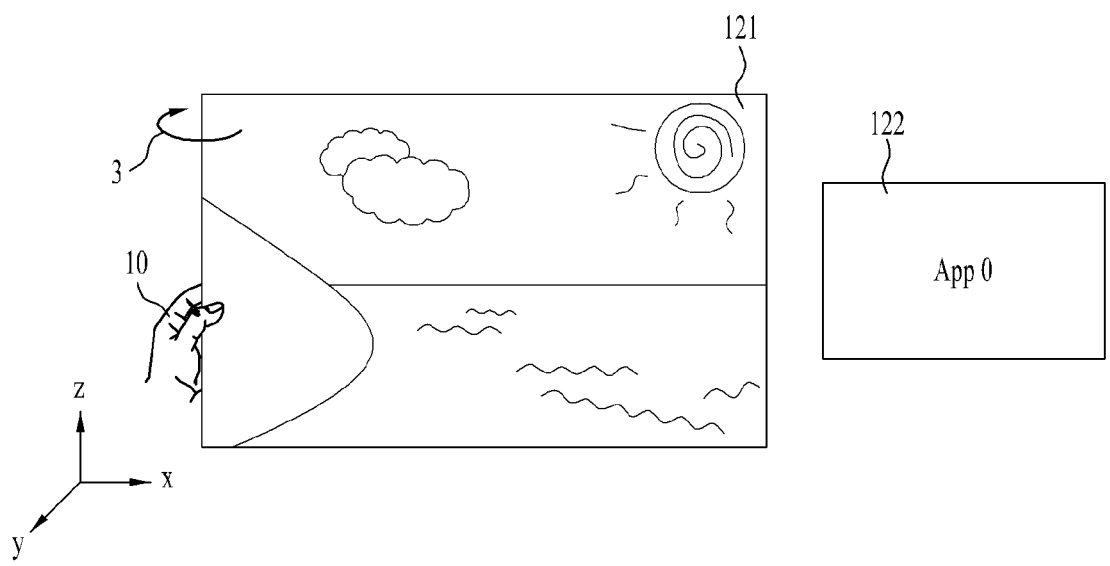
FIG. 7 is a diagram for explaining a content change according to a first embodiment.
Figure 7:
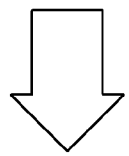
Figure 7:
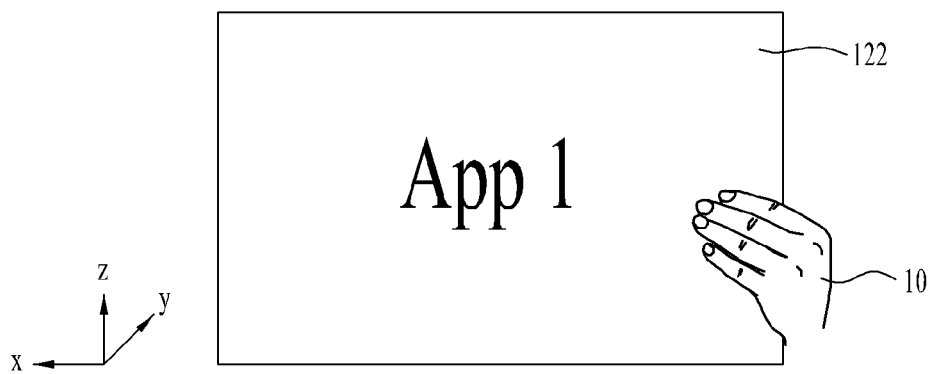

FIG. 7 is a diagram for explaining a content change according to a first embodiment.

Referring to FIG. 7 (1), the first touch display area 121 and the second touch display area 122 can display contents different from each other, respectively. For instance, the first touch display area 121 can display a video and the second touch display area 122 can individually display an application 0. A user is gripping the display device by a left hand 10. Y direction is a direction at which the first touch display area 121 is facing and −y direction is a direction at which the second touch display area 122 is facing. In particular, the user may be positioned at the y direction in FIG. 7 (1) and the y direction corresponds to a first direction. The second touch display area 122 can be arranged toward the second direction corresponding to an opposite direction of the first direction. In some cases, the second touch display area 122 arranged toward the second direction may be in a turned off state.

The user may rotate the display device in the first rotation direction 3 while maintaining the gripped state of the left hand 10.

If the display device rotates in the first rotation direction 3 more than a predetermined angle, the second touch display area 122 can be arranged toward the first direction. If the rotation is performed, the display device can determine whether the griped state is changed in a manner of comparing the gripped state before the rotation of the display device with the gripped state after the rotation of the display device.

Referring to FIG. 7 (2), the second touch display area 122 is arranged toward the first direction at which the user is positioned in a manner that the display device has rotated in the first rotation direction 3 more than a prescribed angle. In FIG. 7 (2), the user may be positioned at the −y direction and the −y direction corresponds to the first direction.

The display device can determine as the display device is maintained in a manner of comparing the gripped state before the rotation of the display device with the gripped state after the rotation of the display device. In this case, the second touch display area 122 can output a predetermined first application. The first application can be configured by the user.

Meanwhile, when the second touch display area 122 is arranged toward the first direction in a manner of being rotated and displays the first application, if the display device receives a touch input via the second touch display area 122, an application output mode of the second touch display area 122 can be changed to the input mode. In particular, the second touch display area 122 can display such an additional UI as a text input window, a virtual keypad, a scroll bar, a control menu and the like together with the first application.

Meanwhile, the first touch display area 121 arranged toward the second direction can be turned off according to the rotation of the display device. In this case, if the first touch display area 121 is arranged toward the first direction again in a manner that the display device rotates in a direction in opposition to the first rotation direction 3, the first touch display area 121 is turned on and the second touch display area 122 arranged toward the second direction may be turned off.

Figure 8:
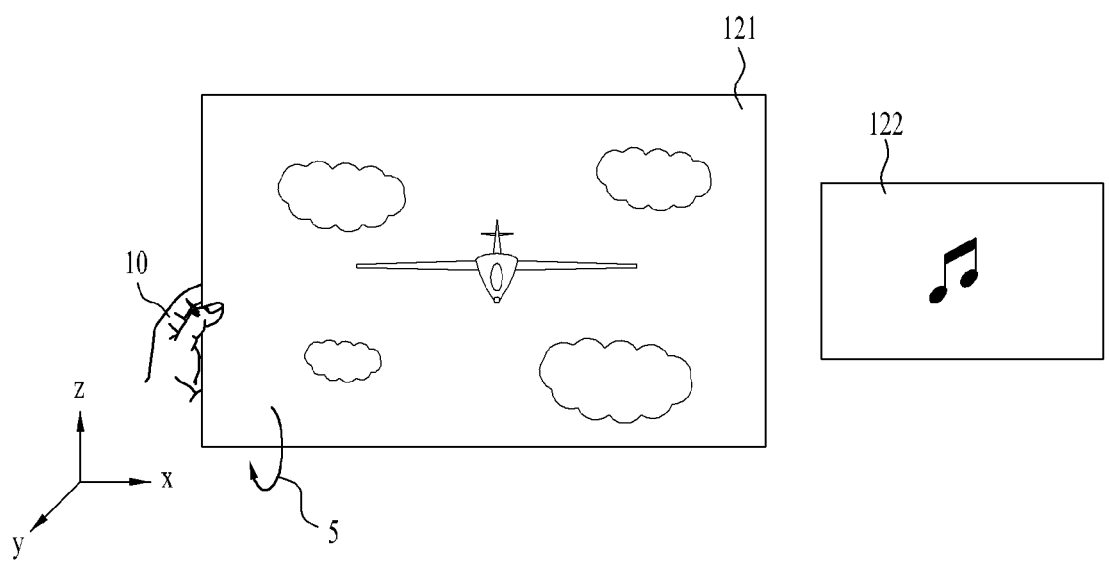
FIG. 8 is a diagram for explaining a change of a content mode according to a second embodiment.
Figure 8:
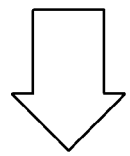
Figure 8:
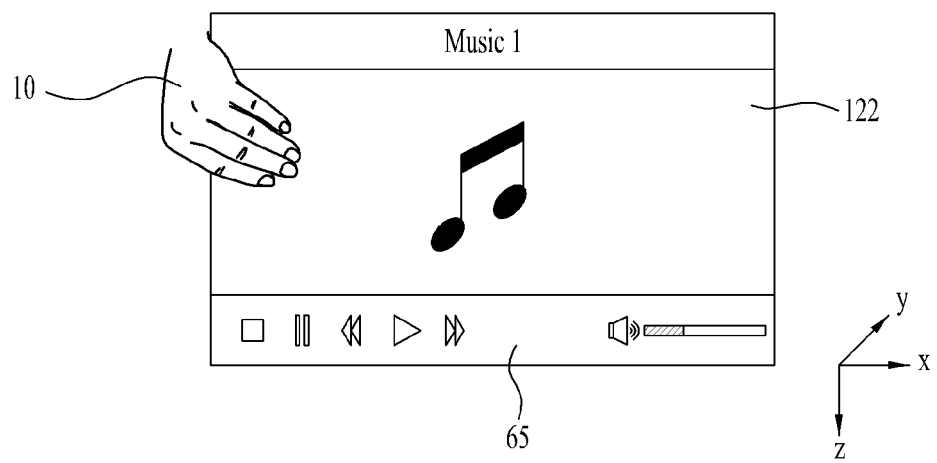

FIG. 8 is a diagram for explaining a change of a content mode according to a second embodiment.

Referring to FIG. 8 (1), the first touch display area 121 and the second touch display area 122 can display contents different from each other, respectively. For instance, the first touch display area 121 can display a game content and the second touch display area 122 can display a music content. A user is gripping the display device by a left hand 10. Y direction is a direction at which the first touch display area 121 is facing and −y direction is a direction at which the second touch display area 122 is facing. In particular, the user may be positioned at the y direction in FIG. 8 (1) and the y direction corresponds to a first direction. The first touch display area 121 can be arranged toward the first direction at which the user is positioned and the second touch display area 122 can be arranged toward a second direction corresponding to an opposite direction of the first direction.

The music content displayed in the second touch display area 122 can be displayed in a full screen mode displaying a basic skin only. In some cases, the second touch display area 122 arranged toward the second direction may be in a turned off state.

The user may rotate the display device in a second rotation direction 5 while maintaining the gripped state of the left hand 10. Although the second rotation direction 5 is depicted as a top/bottom direction in FIG. 8, the second rotation direction can be configured by a different direction.

If the display device rotates in the second rotation direction 5 more than a predetermined angle, the second touch display area 122 can be arranged toward the first direction. For instance, the predetermined angle can be set to 150 degrees. If the rotation is performed, the display device can determine whether the griped state is changed in a manner of comparing the gripped state before the rotation of the display device with the gripped state after the rotation of the display device.

Referring to FIG. 8 (2), the second touch display area 122 is arranged toward the first direction at which the user is positioned in a manner that the display device has rotated in the second rotation direction 5 more than a prescribed angle. In FIG. 8 (2), the user may be positioned at the −y direction and the −y direction corresponds to the first direction.

The display device can determine as the display device is maintained in a manner of comparing the gripped state before the rotation of the display device with the gripped state after the rotation of the display device. In this case, the second touch display area 122 can display content in a predetermined mode while maintaining the content, which is used to be displayed before the rotation. The predetermined mode may correspond to the input mode or the full screen mode.

The input mode indicates a mode for displaying a touch input area in a display area. In particular, the input mode means a mode for displaying a separate UI as well as a main content information. The separate UI may correspond to a form of overlay. For instance, the touch input area or the separate UI indicates such an area capable of inputting a touch input as a text input window, a virtual keypad, a scroll bar, a control menu, a up down button, a left right button and the like.

The full screen mode indicates a mode for displaying main content information only in a whole of the display area while the separate UI is not displayed at all or displayed in a manner of minimizing the separate UI. For instance, in case of a video content, the full screen mode may correspond to a mode for displaying the video itself only and the input mode may correspond to a mode for displaying such a control menu in an overlay form as a stop, a play, a volume control bar, a playback position control bar as well as the video.

FIG. 8 shows an example that the predetermined mode is configured by the input mode. The display device can display content in the second touch display area 122 in the input mode. In particular, the second touch display area 122 can display a display area 65 including such a selection button as a stop, a play, a rewind, a fast forward and the like and a volume control button together with a main skin. Having rotated in the top/bottom direction, the display device can automatically change the top/bottom direction of the content.

And, if the rotated state of the display device and the gripped state of the user are maintained for more than a predetermined time, the display device can display the content in a final mode. For instance, since the music content, which is displayed in the second touch display area 122 before the rotation of the display device, is displayed in the full screen mode, the full screen mode corresponds to the final mode. When the predetermined time is set to 5 seconds, if the gripped state of the user and the rotated state of the display device are maintained for 5 seconds, the music content displayed in the second touch display area 122 can be changed to the full screen mode.

Meanwhile, when the predetermined mode is configured by the full screen mode, the second touch display area 122 is arranged toward the first direction in a manner of being rotated, and the content is displayed in the full screen mode, if the display device receives a touch input via the second touch display area 122, an output mode of the second touch display area 122 can be changed to the input mode.

Meanwhile, the first touch display area 121 arranged toward the second direction can be turned off according to the rotation of the display device. In this case, if the first touch display area 121 is arranged toward the first direction again in a manner that the display device rotates in a direction in opposition to the second rotation direction 5, the first touch display area 121 is turned on and the second touch display area 122 arranged toward the second direction may be turned off.

Figure 9:
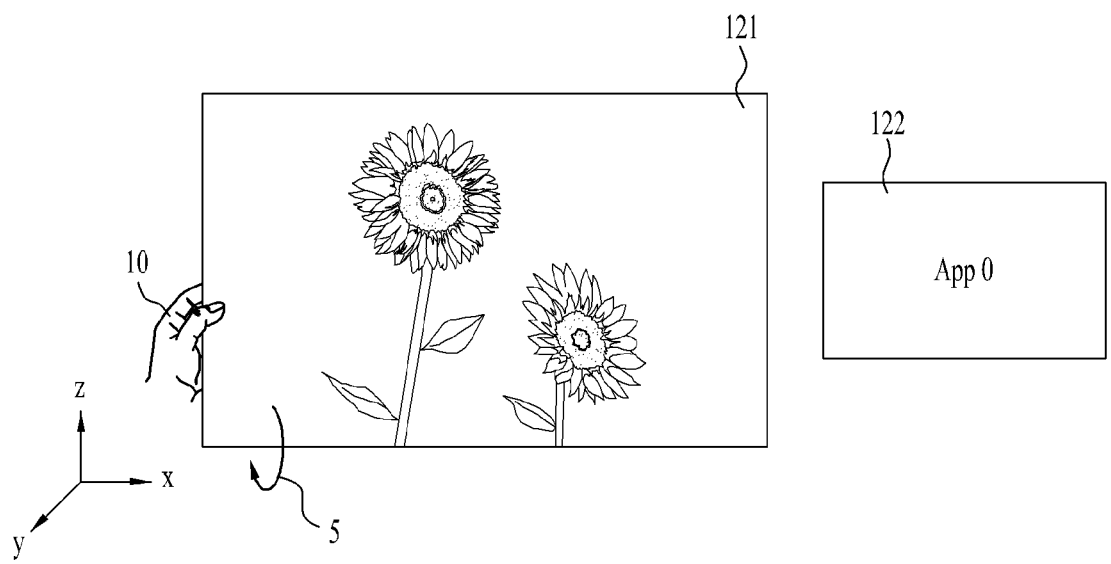
FIG. 9 is a diagram for explaining a content change according to a second embodiment.
Figure 9:
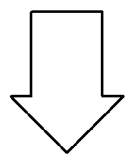
Figure 9:
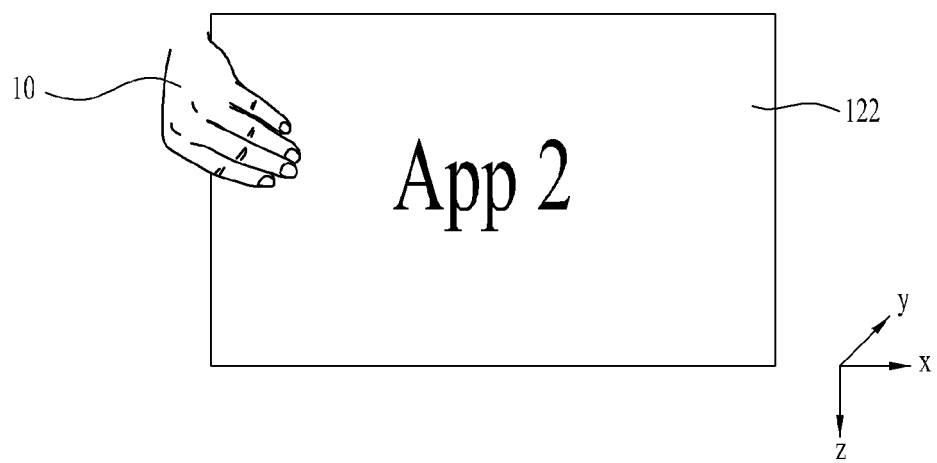

FIG. 9 is a diagram for explaining a content change according to a second embodiment.

Referring to FIG. 9 (1), the first touch display area 121 and the second touch display area 122 can display contents different from each other, respectively. For instance, the first touch display area 121 can display an image and the second touch display area 122 can individually display an application 0. A user is gripping the display device by a left hand 10. Y direction is a direction at which the first touch display area 121 is facing and −y direction is a direction at which the second touch display area 122 is facing. In particular, the user may be positioned at the y direction in FIG. 7 (1) and the y direction corresponds to a first direction. The second touch display area 122 can be arranged toward the second direction corresponding to an opposite direction of the first direction. In some cases, the second touch display area 122 arranged toward the second direction may be in a turned off state.

The user may rotate the display device in the second rotation direction 5 while maintaining the gripped state of the left hand 10.

If the display device rotates in the second rotation direction 5 more than a predetermined angle, the second touch display area 122 can be arranged toward the first direction. If the rotation is performed, the display device can determine whether the griped state is changed in a manner of comparing the gripped state before the rotation of the display device with the gripped state after the rotation of the display device.

Referring to FIG. 9 (2), the second touch display area 122 is arranged toward the first direction at which the user is positioned in a manner that the display device has rotated in the second rotation direction 5 more than a prescribed angle. In FIG. 9 (2), the user may be positioned at the −y direction and the −y direction corresponds to the first direction.

The display device can determine as the display device is maintained in a manner of comparing the gripped state before the rotation of the display device with the gripped state after the rotation of the display device. In this case, the second touch display area 122 can output a predetermined second application. The second application can be configured by the user. Having rotated in the top/bottom direction, the display device can automatically change the top/bottom direction of content.

Meanwhile, when the second touch display area 122 is arranged toward the first direction in a manner of being rotated and displays the second application, if the display device receives a touch input via the second touch display area 122, an application output mode of the second touch display area 122 can be changed to the input mode. In particular, the second touch display area 122 can display such an additional UI as a text input window, a virtual keypad, a scroll bar, a control menu and the like together with the second application.

Meanwhile, the first touch display area 121 arranged toward the second direction can be turned off according to the rotation of the display device. In this case, if the first touch display area 121 is arranged toward the first direction again in a manner that the display device rotates in a direction in opposition to the second rotation direction 5, the first touch display area 121 is turned on and the second touch display area 122 arranged toward the second direction may be turned off.

Figure 10:
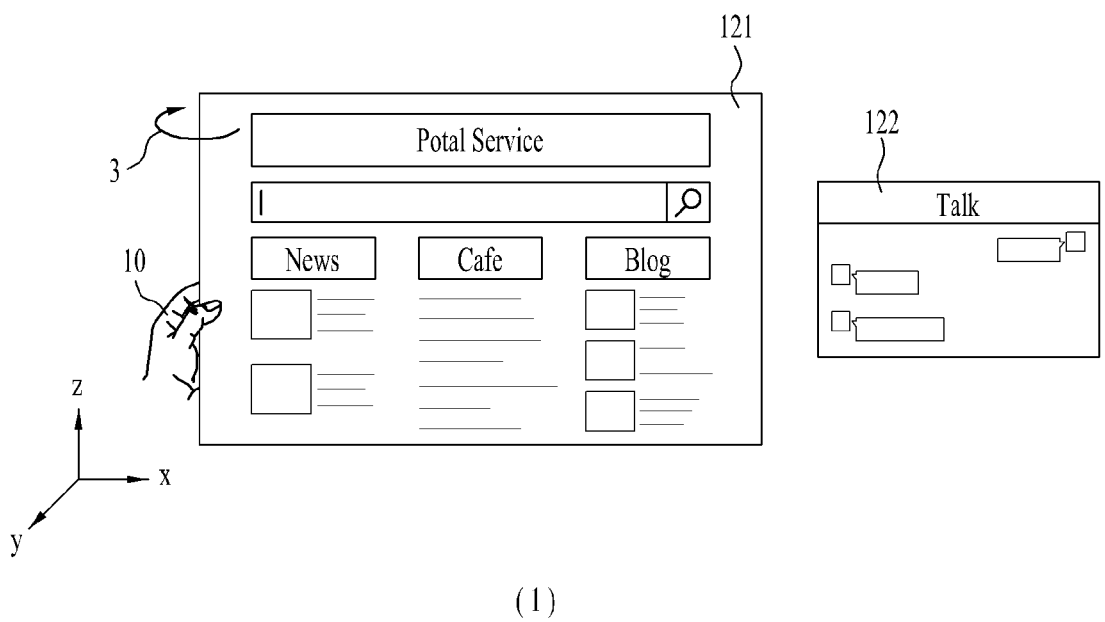
FIG. 10 is a diagram for explaining a change of a content mode according to a third embodiment.
Figure 10:
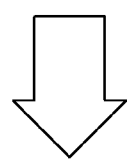
Figure 10:
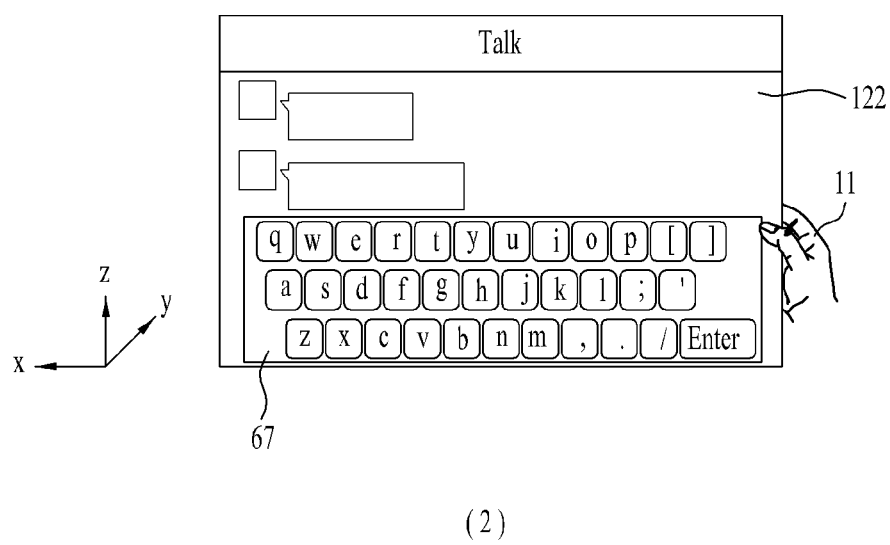

FIG. 10 is a diagram for explaining a change of a content mode according to a third embodiment.

Referring to FIG. 10 (1), the first touch display area 121 and the second touch display area 122 can display contents different from each other, respectively. For instance, the first touch display area 121 can display a web page and the second touch display area 122 can display a chatting application. A user is gripping the display device by a left hand 10. Y direction is a direction at which the first touch display area 121 is facing and −y direction is a direction at which the second touch display area 122 is facing. In particular, the user may be positioned at the y direction in FIG. 10 (1) and the y direction corresponds to a first direction.

The chatting application displayed in the second touch display area 122 can be displayed in a full screen mode displaying main content only. Hence, such an area capable of inputting a touch input as a text input window, a virtual keypad, a scroll bar, a control menu, a up down button, a left right button and the like is not displayed. In some cases, the second touch display area 122 arranged toward the second direction may be in a turned off state.

A user can rotate the display device in a first rotation direction 3 while changing a hand gripping the display device to a right hand 11. If the display device rotates more than a predetermined angle in the first rotation direction 3, the second touch display area 122 can be arranged toward the first direction. If the rotation is performed, the display device can determine whether the gripped state is changed in a manner of comparing the gripped state before the rotation of the display device with the gripped state after the rotation of the display device.

Referring to FIG. 10 (2), the second touch display area 122 is arranged toward the first direction at which the user is positioned in a manner that the display device has rotated in the first rotation direction 3 more than a prescribed angle. Y direction is a direction at which the first touch display area 121 is facing and −y direction is a direction at which the second touch display area 122 is facing. In FIG. 10 (2), the user may be positioned at the −y direction and the −y direction corresponds to the first direction.

The display device can determine as the display device has changed in a manner of comparing the gripped state before the rotation of the display device with the gripped state after the rotation of the display device. In this case, the second touch display area 122 can change a mode only while content, which is used to be displayed before the rotation, is maintained. The display device can display the content in the second touch display area 122 in the input mode. In particular, the second touch display area 122 can display a keypad 67 capable of inputting a text in a manner of overlaying the main content with the keypad.

And, if the rotated state of the display device is maintained for more than a predetermined time, the display device can display the content in a final mode. For instance, since the chatting application, which is displayed in the second touch display area 122 immediately before the rotation of the display device, is displayed in the full screen mode, the full screen mode corresponds to the final mode. When the predetermined time is set to 5 seconds, if the rotated state of the display device is maintained for 5 seconds, the chatting application displayed in the second touch display area 122 can be changed to the full screen mode.

Meanwhile, the first touch display area 121 arranged toward the second direction can be turned off according to the rotation of the display device. In this case, if the first touch display area 121 is arranged toward the first direction again in a manner that the display device rotates in a direction in opposition to the first rotation direction 3, the first touch display area 121 is turned on and the second touch display area 122 arranged toward the second direction may be turned off.

Figure 11:
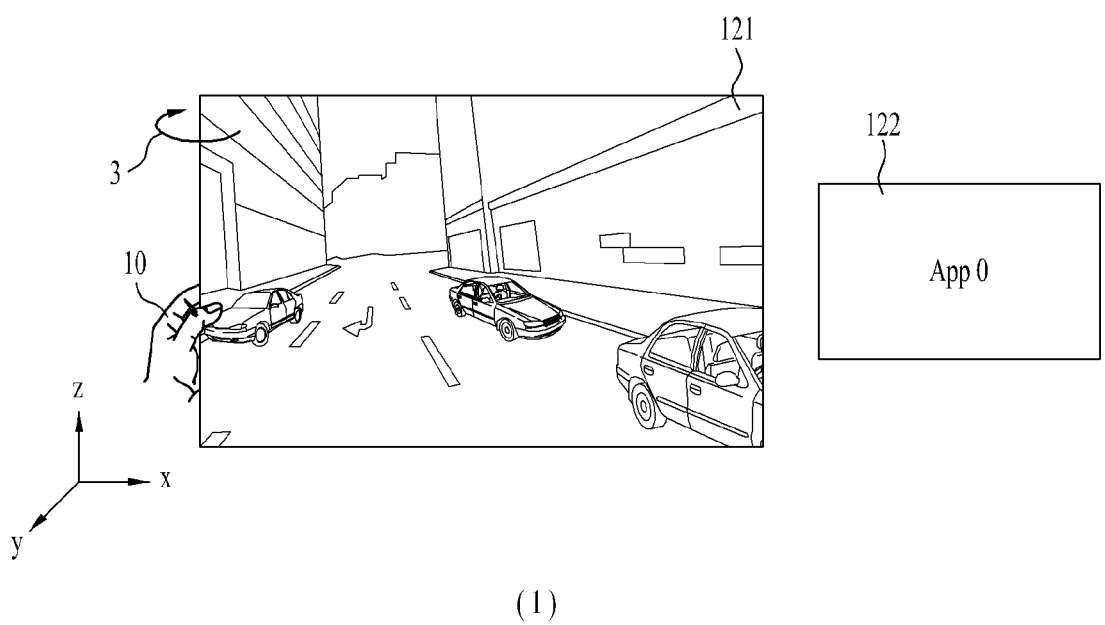
FIG. 11 is a diagram for explaining a content change according to a third embodiment.
Figure 11:
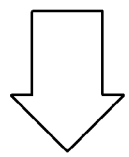
Figure 11:
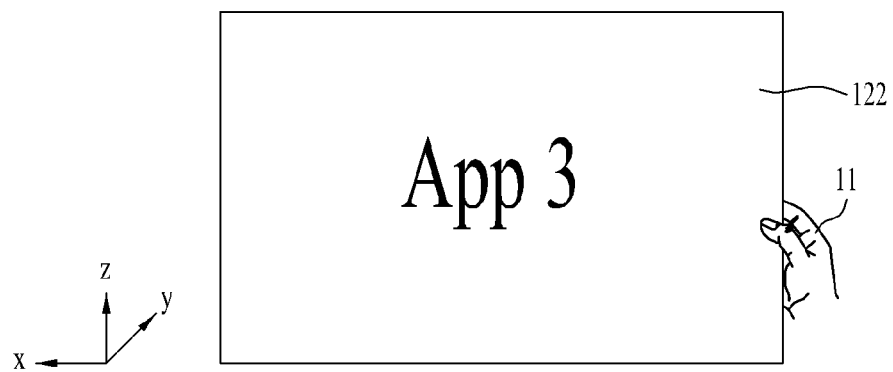

FIG. 11 is a diagram for explaining a content change according to a third embodiment.

Referring to FIG. 11 (1), the first touch display area 121 and the second touch display area 122 can display contents different from each other, respectively. For instance, the first touch display area 121 can display a game content and the second touch display area 122 can individually display an application 0. A user is gripping the display device by a left hand 10. Y direction is a direction at which the first touch display area 121 is facing and −y direction is a direction at which the second touch display area 122 is facing. In particular, the user may be positioned at the y direction in FIG. 11 (1) and the y direction corresponds to a first direction. The second touch display area 122 can be arranged toward the second direction corresponding to an opposite direction of the first direction. In some cases, the second touch display area 122 arranged toward the second direction may be in a turned off state.

A user can rotate the display device in a first rotation direction 3 while changing a hand gripping the display device to a right hand 11. If the display device rotates more than a predetermined angle in the first rotation direction 3, the second touch display area 122 can be arranged toward the first direction. If the rotation is performed, the display device can determine whether the gripped state is changed in a manner of comparing the gripped state before the rotation of the display device with the gripped state after the rotation of the display device.

If the display device rotates more than a predetermined angle in the first rotation direction 3, the second touch display area 122 can be arranged toward the first direction. If the rotation is performed, the display device can determine whether the gripped state is changed in a manner of comparing the gripped state before the rotation of the display device with the gripped state after the rotation of the display device.

Referring to FIG. 11 (2), the second touch display area 122 is arranged toward the first direction at which the user is positioned in a manner that the display device has rotated in the first rotation direction 3 more than a prescribed angle. In FIG. 11 (2), the user may be positioned at the −y direction and the −y direction corresponds to the first direction.

The display device can determine as the display device has changed in a manner of comparing the gripped state before the rotation of the display device with the gripped state after the rotation of the display device. In this case, the second touch display area 122 can output a predetermined third application. The third application can be configured by the user.

Meanwhile, when the second touch display area 122 is arranged toward the first direction in a manner of being rotated and displays the third application, if the display device receives a touch input via the second touch display area 122, an application output mode of the second touch display area 122 can be changed to the input mode. In particular, the second touch display area 122 can display such an additional UI as a text input window, a virtual keypad, a scroll bar, a control menu and the like together with the third application.

Meanwhile, the first touch display area 121 arranged toward the second direction can be turned off according to the rotation of the display device. In this case, if the first touch display area 121 is arranged toward the first direction again in a manner that the display device rotates in a direction in opposition to the first rotation direction 3, the first touch display area 121 is turned on and the second touch display area 122 arranged toward the second direction may be turned off.

Figure 12:
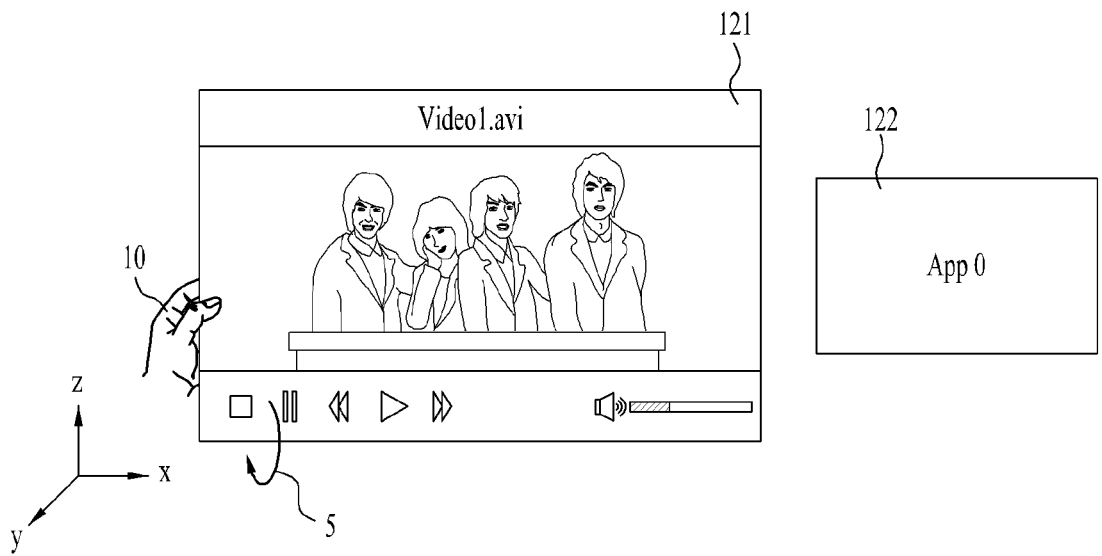
FIG. 12 is a diagram for explaining a content change according to a fourth embodiment.
Figure 12:
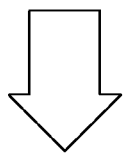
Figure 12:
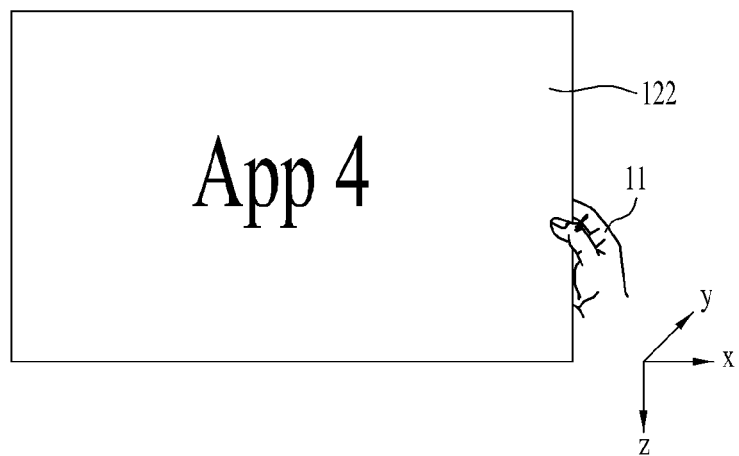

FIG. 12 is a diagram for explaining a content change according to a fourth embodiment.

Referring to FIG. 12 (1), the first touch display area 121 and the second touch display area 122 can display contents different from each other, respectively. For instance, the first touch display area 121 can display a video content and the second touch display area 122 can individually display an application 0. A user is gripping the display device by a left hand 10. Y direction is a direction at which the first touch display area 121 is facing and −y direction is a direction at which the second touch display area 122 is facing. In particular, the user may be positioned at the y direction in FIG. 12 (1) and the y direction corresponds to a first direction. The second touch display area 122 can be arranged toward the second direction corresponding to an opposite direction of the first direction. In some cases, the second touch display area 122 arranged toward the second direction may be in a turned off state.

A user can rotate the display device in a second rotation direction 5 while changing a hand gripping the display device to a right hand 11. If the display device rotates more than a predetermined angle in the second rotation direction 5, the second touch display area 122 can be arranged toward the first direction. If the rotation is performed, the display device can determine whether the gripped state is changed in a manner of comparing the gripped state before the rotation of the display device with the gripped state after the rotation of the display device.

If the display device rotates more than a predetermined angle in the second rotation direction 5, the second touch display area 122 can be arranged toward the first direction. If the rotation is performed, the display device can determine whether the gripped state is changed in a manner of comparing the gripped state before the rotation of the display device with the gripped state after the rotation of the display device.

Referring to FIG. 12 (2), the second touch display area 122 is arranged toward the first direction at which the user is positioned in a manner that the display device has rotated in the second rotation direction 5 more than a prescribed angle. In FIG. 12 (2), the user may be positioned at the −y direction and the −y direction corresponds to the first direction.

The display device can determine as the display device has changed in a manner of comparing the gripped state before the rotation of the display device with the gripped state after the rotation of the display device. In this case, the second touch display area 122 can output a predetermined fourth application. The fourth application can be configured by the user. Having rotated in the top/bottom direction, the display device can automatically change the top/bottom direction of content.

Meanwhile, when the second touch display area 122 is arranged toward the first direction in a manner of being rotated and displays the fourth application, if the display device receives a touch input via the second touch display area 122, an application output mode of the second touch display area 122 can be changed to the input mode. In particular, the second touch display area 122 can display such an additional UI as a text input window, a virtual keypad, a scroll bar, a control menu and the like together with the fourth application.

Meanwhile, the first touch display area 121 arranged toward the second direction can be turned off according to the rotation of the display device. In this case, if the first touch display area 121 is arranged toward the first direction again in a manner that the display device rotates in a direction in opposition to the second rotation direction 5, the first touch display area 121 is turned on and the second touch display area 122 arranged toward the second direction may be turned off.

Meanwhile, the aforementioned first to the fourth application may correspond to applications different from each other.

Various embodiments for changing a screen of the second touch display area according to a rotated state and a gripped state of the display device have been explained so far. In the following, a flowchart for a method of controlling the display device is explained.

Figure 13:
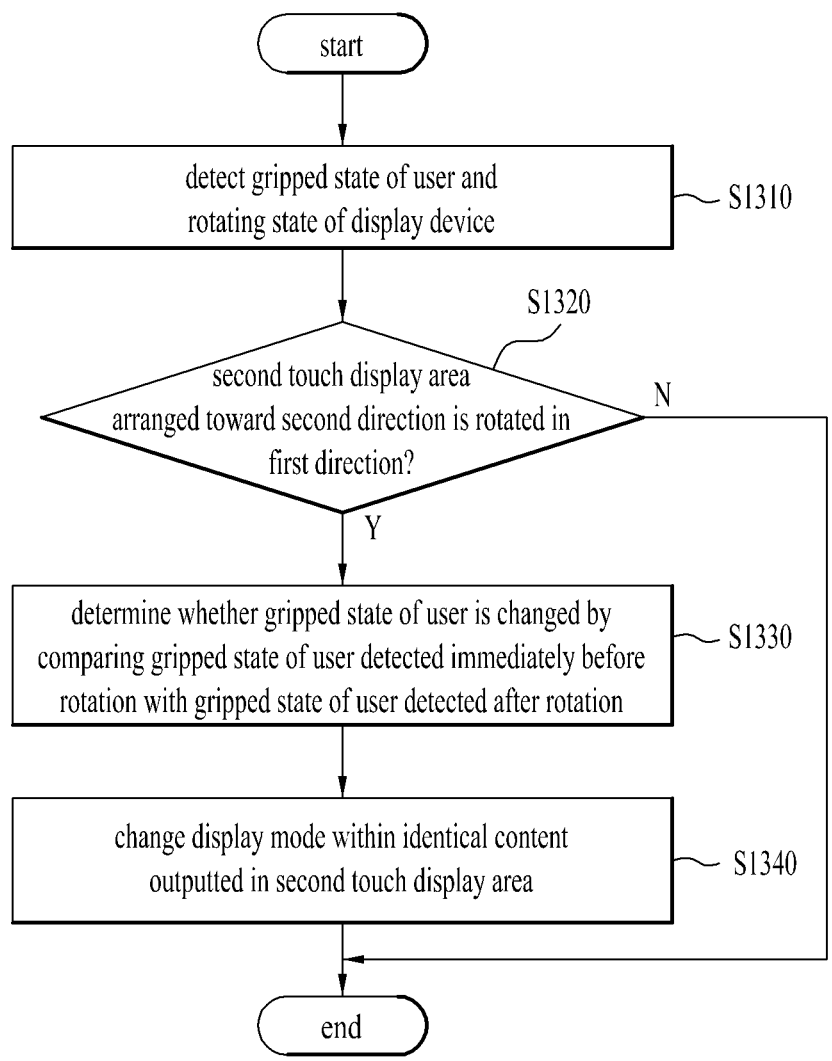
FIG. 13 is a flowchart for a method of controlling a display according to one embodiment.

FIG. 13 is a flowchart for a method of controlling a display according to one embodiment.

Referring to FIG. 13, a display device can detect a gripped state of a user and a rotated state of the display device [S1310]. The display device can include a display including a first touch display area and a second touch display area. The first touch display area is arranged toward a first direction at which the user is positioned and the second touch display area can be arranged toward a direction in opposition to the first direction.

The display device can determine whether the second touch display area arranged toward a second direction is rotated in the first direction [S1320]. The display device can determine whether the first touch display area, which is arranged toward the first direction at which the user is positioned, is facing the second direction and whether the second touch display area, which is arranged toward the second direction, is facing the first direction based on the rotated state of the display device.

And, the display device can determine whether the gripped state of the user is changed in a manner of comparing the gripped state of the user which is detected immediately before the rotation of the display device with the gripped state of the user which is detected after the rotation of the display device [S1330]. The display device can determine the rotated state and the gripped state at the same time.

If it is determined that the second touch display area is facing the first direction at which the user is positioned, the display device can change a display mode within an identical content, which is outputted in the second touch display area, based on the rotated state and the gripped state [S1340].

If the second touch display area is arranged toward the first direction in a manner of being rotated more than a predetermined angle in a predetermined first rotating direction and if it is determined that the gripped state is maintained as a result of comparing the gripped state of the user detected after the rotation with the gripped state of the user detected immediately before the rotation, the display device can display content in the second touch display area in a full screen mode.

And, if the second touch display area is arranged toward the first direction in a manner of being rotated more than the predetermined angle in the predetermined first rotating direction and if it is determined that the gripped state is changed as a result of comparing the gripped state of the user detected after the rotation with the gripped state of the user detected immediately before the rotation, the display device can display the content in the second touch display area in an input mode.

Or, the display device can change the content outputted in the second touch display area. For instance, the display device can output a predetermined content irrespective of the content currently outputted according to the rotating direction and the gripped state.

A display device and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a method of controlling a display device can be implemented with a software readable by a processor in a recording media readable by the processor, which is equipped in the display device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. And, to implement in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A display device, comprising:
   a display configured to include a first touch display area which is arranged to display content toward a first direction at which a user is positioned and a second touch display area which is arranged to display content toward a second direction corresponding to an opposite direction of the first direction;
   a sensor unit configured to detect a gripped state of the user and a rotating state of the display device; and
   when it is determined that the second touch display area is facing the first direction at which the user is positioned based on the gripped state and the rotating state, a controller configured to change a display mode while an identical content is displayed in the second touch display area,
   wherein the controller is further configured to determine whether the gripped state of the user is changed by comparing the gripped state of the user which is detected before a rotation of the display device with the gripped state of the user which is detected after the rotation of the display device, and
   wherein if the second touch display area is arranged toward the first direction in a manner that the display device rotates more than a predetermined angle in a predetermined first rotating direction and if it is determined as the gripped state of the user is maintained as a result of comparing the gripped state of the user detected after the rotation with the gripped state of the user detected immediately before the rotation, the controller is further configured to control the second touch display area to display the content in a full screen mode.

2. The display device of claim 1, wherein the sensor unit is further configured to detect information on at least one of a touch area and a touch shape of a hand of the user gripping the display device and wherein the controller is further configured to determine a direction at which the user is positioned based on the detected information.

3. The display device of claim 1, wherein the sensor unit is further configured to include a camera, wherein the camera is configured to capture the user and wherein the controller is further configured to determine a direction at which the user is positioned based on information of the captured user.

4. The display device of claim 1, wherein the controller is further configured to determine whether the gripped state of the user is changed in a manner of further comparing the gripped state of the user which is detected while the display device is rotating.

5. The display device of claim 1, wherein if a touch input is received via the second touch display area, the controller is configured to control the second touch display area to display the content in an input mode.

6. The display device of claim 1, wherein if a rotated state of the display device and the gripped state of the user are maintained for more than a predetermined time, the controller is further configured to control the second touch display area to display the content in a final mode corresponding to a mode used to display the content in the second touch display area.

7. The display device of claim 1, wherein the controller is further configured to turn off the first touch display area.

8. The display device of claim 1, wherein if the second touch display area is arranged toward the first direction in a manner that the display device rotates more than a predetermined angle in a predetermined second rotating direction and if it is determined as the gripped state of the user is maintained as a result of comparing the gripped state of the user detected after the rotation with the gripped state of the user detected immediately before the rotation, the controller is further configured to control the second touch display area to display the content in a predetermined mode.

9. The display device of claim 8, wherein the predetermined mode corresponds to an input mode or a full screen mode.

10. The display device of claim 9, wherein the input mode corresponds to a mode displaying a touch input area in at least one touch display area of the first touch display area and the second touch display area.

11. The display device of claim 10, wherein the touch input area corresponds to an area displaying at least one selected from the group consisting of a text input window, a virtual keypad, a scroll bar and a control menu.

12. The display device of claim 1, wherein if the second touch display area is arranged toward the first direction in a manner that the display device rotates more than a predetermined angle in a predetermined first rotating direction and if it is determined as the gripped state of the user is changed as a result of comparing the gripped state of the user detected after the rotation with the gripped state of the user detected immediately before the rotation, the controller is further configured to control the second touch display area to display the content in an input mode.

13. A display device, comprising:
a display configured to include a first touch display area which is arranged to display content toward a first direction at which a user is positioned and a second touch display area which is arranged to display content toward a second direction corresponding to an opposite direction of the first direction;
a sensor unit configured to detect a gripped state of the user and a rotating state of the display device; and
when it is determined that the second touch display area is facing the first direction at which the user is positioned based on the gripped state and the rotating state, a controller configured to change content which is displayed in the second touch display area,
wherein the controller is further configured to determine whether the gripped state of the user is changed by comparing the gripped state of the user which is detected before a rotation of the display device with the gripped state of the user which is detected after the rotation of the display device, and
wherein when the second touch display area is arranged toward the first direction in a manner that the display device rotates more than a predetermined angle in a predetermined first rotating direction and when it is determined as the gripped state of the user is maintained as a result of comparing the gripped state of the user detected after the rotation with the gripped state of the user detected immediately before the rotation, the controller is further configured to control the second touch display area to display a predetermined first application content.

14. The display device of claim 13, wherein when the second touch display area is arranged toward the first direction in a manner that the display device rotates more than a predetermined angle in a predetermined second rotating direction and when it is determined as the gripped state of the user is maintained as a result of comparing the gripped state of the user detected after the rotation with the gripped state of the user detected immediately before the rotation, the controller is further configured to control the second touch display area to display a predetermined second application content.

15. The display device of claim 13, wherein when the second touch display area is arranged toward the first direction in a manner that the display device rotates more than a predetermined angle in a predetermined first rotating direction and when it is determined as the gripped state of the user is changed as a result of comparing the gripped state of the user detected after the rotation with the gripped state of the user detected immediately before the rotation, the controller is further configured to control the second touch display area to display a predetermined third application content.

16. The display device of claim 13, wherein when the second touch display area is arranged toward the first direction in a manner that the display device rotates more than a predetermined angle in a predetermined second rotating direction and when it is determined as the gripped state of the user is changed as a result of comparing the gripped state of the user detected after the rotation with the gripped state of the user detected immediately before the rotation, the controller is further configured to control the second touch display area to display a predetermined fourth application content.

17. A method of controlling a display device including a display, which contains a first touch display area and a second touch display area, comprising the steps of:
detecting a gripped state of a user and a rotating state of the display device;
determining whether the first touch display area, which is arranged toward a first direction at which the user is positioned, is facing a second direction corresponding to an opposite direction of the first direction, whether the second touch display area, which is arranged toward the second direction, is facing the first direction and whether the gripped state of the user is changed based on the rotating state of the display device; and
when it is determined that the second touch display area is facing the first direction at which the user is positioned, changing a display mode while an identical content is displayed in the second touch display area, wherein the determining step determines whether the gripped state of the user is changed by comparing the gripped state of the user which is detected before a rotation of the display device with the gripped state of the user which is detected after the rotation of the display device, and wherein when the second touch display area is arranged toward the first direction in a manner that the display device rotates more than a predetermined angle in a predetermined first rotating direction and when it is determined as the gripped state of the user is maintained as a result of comparing the gripped state of the user detected after the rotation with the gripped state of the user detected immediately before the rotation, the display mode changing step displays content in the second touch display area in a full screen mode.

* * * * *